US012700057B2

(12) United States Patent
Deng et al.

(10) Patent No.: US 12,700,057 B2
(45) Date of Patent: Aug. 4, 2026

(54) IMAGE PROCESSING METHOD AND APPARATUS, REASONABLY STORING INCREMENTAL SNAPSHOT AND FULL SNAPSHOT IN SNAPSHOT CHAIN, AND ELECTRONIC DEVICE AND READABLE STORAGE MEDIUM

(71) Applicant: Beijing Zitiao Network Technology Co., Ltd., Beijing (CN)

(72) Inventors: Chunguo Deng, Beijing (CN); Xinghua Zhang, Beijing (CN); Guanming Cai, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 217 days.

(21) Appl. No.: 18/573,188

(22) PCT Filed: Jul. 28, 2022

(86) PCT No.: PCT/CN2022/108578
§ 371 (c)(1),
(2) Date: Dec. 21, 2023

(87) PCT Pub. No.: WO2023/006024
PCT Pub. Date: Feb. 2, 2023

(65) Prior Publication Data
US 2024/0303884 A1 Sep. 12, 2024

(30) Foreign Application Priority Data
Jul. 30, 2021 (CN) .......................... 202110872733.4

(51) Int. Cl.
*G06T 11/60* (2026.01)
*G06T 1/60* (2006.01)

(52) U.S. Cl.
CPC ............... *G06T 11/60* (2013.01); *G06T 1/60* (2013.01)

(58) Field of Classification Search
None
See application file for complete search history.

(56) References Cited

U.S. PATENT DOCUMENTS 5,828,860 A * 10/1998 Miyaoku ................. G06F 9/383
712/E9.046
9,361,185 B1 6/2016 Bushman
(Continued)

FOREIGN PATENT DOCUMENTS

CN 103440160 A 12/2013
CN 105744281 A 7/2016
(Continued)

OTHER PUBLICATIONS

International Search Report and Written Opinion dated Oct. 21, 2022 in PCT/CN2022/108578, English translation (16 pages).
(Continued)

*Primary Examiner* — Jason A Pringle-Parker

(57) ABSTRACT

The present disclosure relates to an image processing method and apparatus, and an electronic device and a readable storage medium. In the method, by means of analyzing, during an image editing process, the proportion of difference image blocks corresponding to a first image, and the snapshot types of the last N snapshots in a snapshot chain that is generated according to consecutive image editing instructions, a storage mode of the first image is determined.

17 Claims, 5 Drawing Sheets

(56)        References Cited

U.S. PATENT DOCUMENTS

| | | | |
|---|---|---|---|
| 10,534,759 | B1 | 1/2020 | Manjunath et al. |
| 10,838,912 | B1 | 11/2020 | Chopra et al. |
| 2003/0028543 | A1* | 2/2003 | Dusberger .......... G06F 16/9566 |
| | | | 707/E17.112 |
| 2007/0073783 | A1* | 3/2007 | Honami ................ G06F 16/128 |
| 2012/0106852 | A1* | 5/2012 | Khawand .............. H04N 19/15 |
| | | | 382/218 |
| 2013/0120439 | A1* | 5/2013 | Harris .................... G11B 27/34 |
| | | | 345/619 |
| 2019/0179918 | A1* | 6/2019 | Singh .................. G06F 11/1461 |
| 2020/0241756 | A1* | 7/2020 | Lee ......................... G06F 3/065 |
| 2021/0124725 | A1* | 4/2021 | Love .................. G06F 16/2237 |
| 2021/0157677 | A1 | 5/2021 | Vokaliga et al. |
| 2021/0342084 | A1* | 11/2021 | Ng .......................... G06F 3/061 |

FOREIGN PATENT DOCUMENTS

| | | |
|---|---|---|
| CN | 110188068 A | 8/2019 |
| CN | 111104255 A | 5/2020 |
| WO | 2019/112955 A1 | 6/2019 |

OTHER PUBLICATIONS

Notice of Allowance received for Chinese patent application No. 202110872733.4 mailed on Mar. 31, 2026, 8 pages (4 pages English Translation and 4 pages Original document).

* cited by examiner

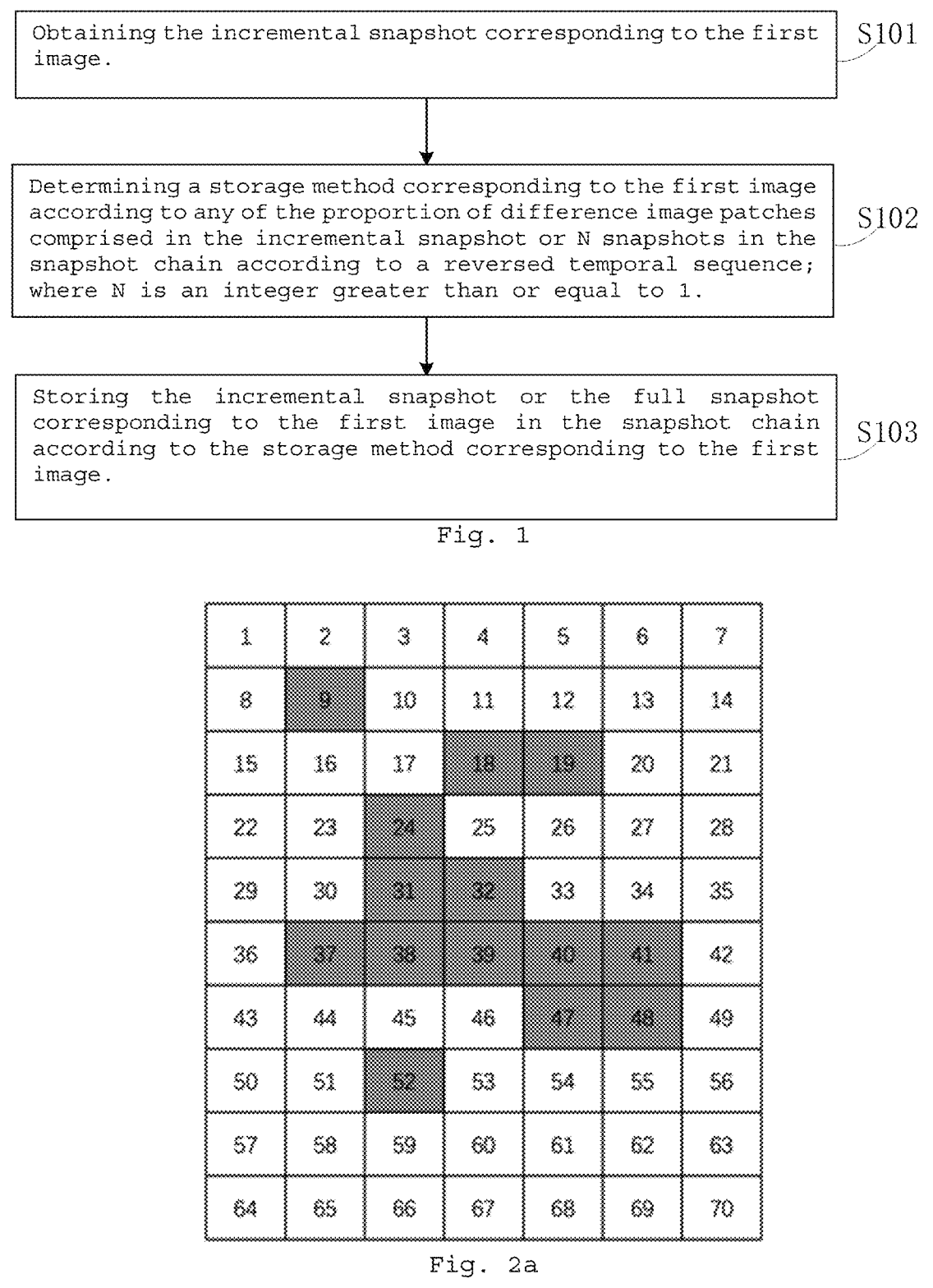

| | |
|---|---|
| Obtaining the incremental snapshot corresponding to the first image. | S101 |

| | |
|---|---|
| Determining a storage method corresponding to the first image according to any of the proportion of difference image patches comprised in the incremental snapshot or N snapshots in the snapshot chain according to a reversed temporal sequence; where N is an integer greater than or equal to 1. | S102 |

| | |
|---|---|
| Storing the incremental snapshot or the full snapshot corresponding to the first image in the snapshot chain according to the storage method corresponding to the first image. | S103 |

Fig. 1

| 1 | 2 | 3 | 4 | 5 | 6 | 7 |
|---|---|---|---|---|---|---|
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 | 32 | 33 | 34 | 35 |
| 36 | 37 | 38 | 39 | 40 | 41 | 42 |
| 43 | 44 | 45 | 46 | 47 | 48 | 49 |
| 50 | 51 | 52 | 53 | 54 | 55 | 56 |
| 57 | 58 | 59 | 60 | 61 | 62 | 63 |
| 64 | 65 | 66 | 67 | 68 | 69 | 70 |

Fig. 2a

Difference image region 1

Difference image region 2

Difference image region 3

Difference image region 4

Difference image region

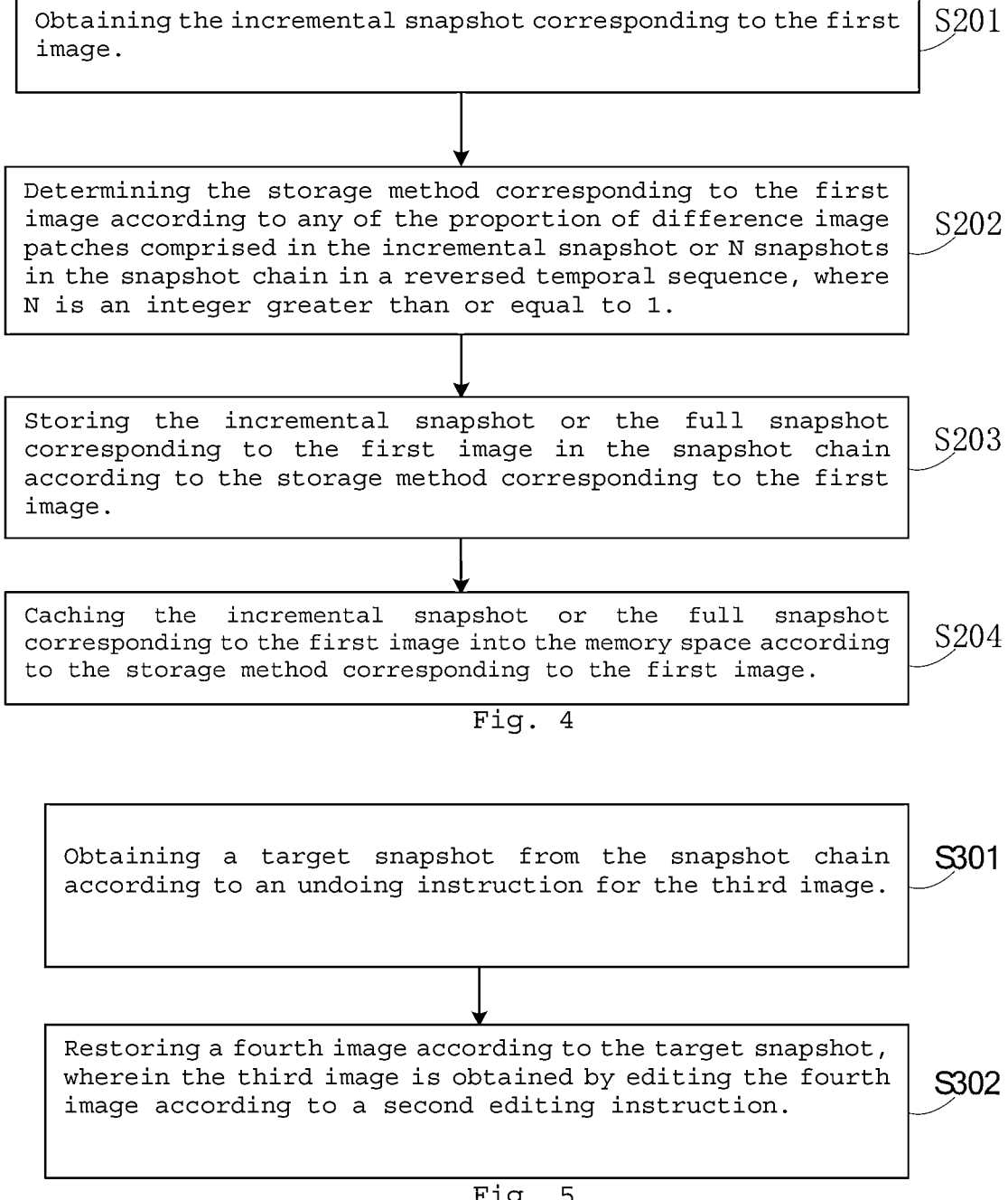

Obtaining the incremental snapshot corresponding to the first image.    S201

Determining the storage method corresponding to the first image according to any of the proportion of difference image patches comprised in the incremental snapshot or N snapshots in the snapshot chain in a reversed temporal sequence, where N is an integer greater than or equal to 1.    S202

Storing the incremental snapshot or the full snapshot corresponding to the first image in the snapshot chain according to the storage method corresponding to the first image.    S203

Caching the incremental snapshot or the full snapshot corresponding to the first image into the memory space according to the storage method corresponding to the first image.    S204

Fig. 4

Obtaining a target snapshot from the snapshot chain according to an undoing instruction for the third image.    S301

Restoring a fourth image according to the target snapshot, wherein the third image is obtained by editing the fourth image according to a second editing instruction.    S302

Fig. 5

IMAGE PROCESSING METHOD AND APPARATUS, REASONABLY STORING INCREMENTAL SNAPSHOT AND FULL SNAPSHOT IN SNAPSHOT CHAIN, AND ELECTRONIC DEVICE AND READABLE STORAGE MEDIUM

CROSS-REFERENCE TO RELATED APPLICATIONS

This application is a U.S. National Stage under 35 U.S.C. § 371 of International Application No. PCT/CN2022/108578, as filed on Jul. 28, 2022, which claims priority to China Patent Application No. 202110872733.4 filed on Jul. 30, 2021, the disclosure of each of these applications is incorporated by reference herein in its entirety.

TECHNICAL FIELD

The present disclosure relates to the field of image processing technology, in particular to an image processing method and apparatus, an electronic device and a readable storage medium.

BACKGROUND

With the rapid development of Internet technology, the user may often choose to use an application to perform several steps of operations such as stickers and filters on an image. The application may store a snapshot generated by each step of operation to form a snapshot chain for the user to undo and redo the same.

In the related art, a lossless compression storage method is usually used for snapshot storage. Specifically, the application may compress a processed image obtained by each step of image editing operation and store the same in the disk space as a lossless compressed image in a png format.

SUMMARY

In order to solve the technical problem in the related art or at least partially solve the technical problem in the related art, the present disclosure provides an image processing method and apparatus, an electronic device and a readable storage medium.

In a first aspect according to an embodiment of the present disclosure, an image processing method is provided, which comprises:

obtaining an incremental snapshot corresponding to a first image; wherein the incremental snapshot comprises data of difference image patches between the first image and a second image, and the first image is obtained by editing the second image according to a first editing instruction;

determining a storage method corresponding to the first image according to any of the proportion of difference image patches comprised in the incremental snapshot or N snapshots in the snapshot chain in a reversed temporal sequence; where N is an integer greater than or equal to 1; and storing an incremental snapshot or a full snapshot corresponding to the first image into the snapshot chain according to the storage method corresponding to the first image.

In some possible designs, the determining a storage method corresponding to the first image according to any of the proportion of difference image patches comprised in the incremental snapshot or N snapshots in the snapshot chain in a reversed temporal sequence comprises:

applying the storage method corresponding to the first image to instruct to store a full snapshot corresponding to the first image if the proportion of difference image patches comprised in the incremental snapshot is greater than or equal to a preset threshold, or if all the N snapshots are incremental snapshots; and applying the storage method corresponding to the first image to instruct to store an incremental snapshot corresponding to the first image if the proportion of difference image patches comprised in the incremental snapshot is less than the preset threshold, and the N snapshots comprise full snapshots.

In some possible designs, the incremental snapshot comprises data of at least one difference image region; each difference image patch between the first image and the second image belongs to one of the plurality of difference image regions when the number of the difference image regions is plural.

In some possible designs, the at least one difference image region is determined according to the continuity of difference image patches between the first image and the second image.

In some possible designs, the method further comprises: caching an incremental snapshot or a full snapshot corresponding to the first image into a memory space according to the storage method corresponding to the first image, wherein the memory space is used to cache M snapshots in the snapshot chain in a reversed temporal sequence, where M is an integer greater than or equal to 1, and M is less than or equal to N.

In some possible designs, the method further comprises:

obtaining a target snapshot from the snapshot chain according to an undoing instruction for a third image; the target snapshot comprises a target full snapshot and all the snapshots between the target full snapshot and a snapshot corresponding to the third image; the target full snapshot is the first full snapshot in the snapshot chain in a reversed temporal sequence before the snapshot corresponding to the third image; and restoring a fourth image according to the target snapshot, wherein the third image is obtained by editing the fourth image according to a second editing instruction.

In some possible designs, the obtaining a target snapshot from the snapshot chain according to an undoing instruction for a third image comprises:

obtaining the target snapshot from the memory space if M snapshots cached in the memory space comprise the target snapshot;

reading some snapshots from an external storage space and writing the same into the memory space if M snapshots cached in the memory space do not comprise some snapshots of the target snapshot.

In a second aspect according to an embodiment of the present disclosure, an image processing apparatus is provided, which comprises:

an obtaining module configured to obtain an incremental snapshot corresponding to a first image; wherein the incremental snapshot comprises data of difference image patches between the first image and a second image, and the first image is obtained by editing the second image according to a first editing instruction; and a processing module configured to determine a storage method corresponding to the first image according to any of the proportion of difference image patches comprised in the incremental snapshot or N snapshots in the snapshot chain in a reversed temporal sequence; where N is an integer greater than or equal to 1; and store an incremental snapshot or a full snapshot corresponding to the first image into the snapshot chain according to the storage method corresponding to the first image.

In a third aspect according to an embodiment of the present disclosure, an electronic device is provided, which comprises: a memory, a processor, and computer program instructions;

wherein the memory is configured to store the computer program instructions; and the processor is configured to execute the computer program instructions to implement the method according to any item in the first aspect.

In a fourth aspect according to an embodiment of the present disclosure, a readable storage medium is provided, which comprises: a program;

wherein when the program is executed by at least one processor of an electronic device, it implements the method according to any item in the first aspect.

In a fifth aspect according to an embodiment of the present disclosure, a computer program product is provided, which comprises computer program instructions;

wherein the computer program instructions are stored in a readable storage medium, and at least one processor of the electronic device may read the computer program instructions from the readable storage medium, so that the at least one processor executes the computer program instructions to cause the electronic device to implement the method according to any item in the first aspect.

BRIEF DESCRIPTION OF THE ACCOMPANYING DRAWINGS

The accompanying drawings, which are incorporated into this specification and constitute part of this specification, show the embodiments conforming to the present disclosure and serve to explain the principles of the present disclosure together with the specification.

In order to explain the technical solution in the embodiments of the present disclosure or in the related art more explicitly, the accompanying drawings required to be used in the description of the embodiments or the related art will be briefly introduced below; obviously, for those of ordinary skill in the relevant art, other accompanying drawings may also be obtained according to these accompanying drawings on the premise that no inventive effort is involved.

FIG. 1 is a flowchart of an image processing method provided by an embodiment of the present disclosure;

FIGS. 2a-2c are schematic structural views of difference image regions provided by the present disclosure;

FIG. 4 is a flowchart of an image processing method provided by another embodiment of the present disclosure;

FIG. 5 is a flowchart of an image processing method provided by another embodiment of the present disclosure;

DETAILED DESCRIPTION

Figures 2B, 2C:
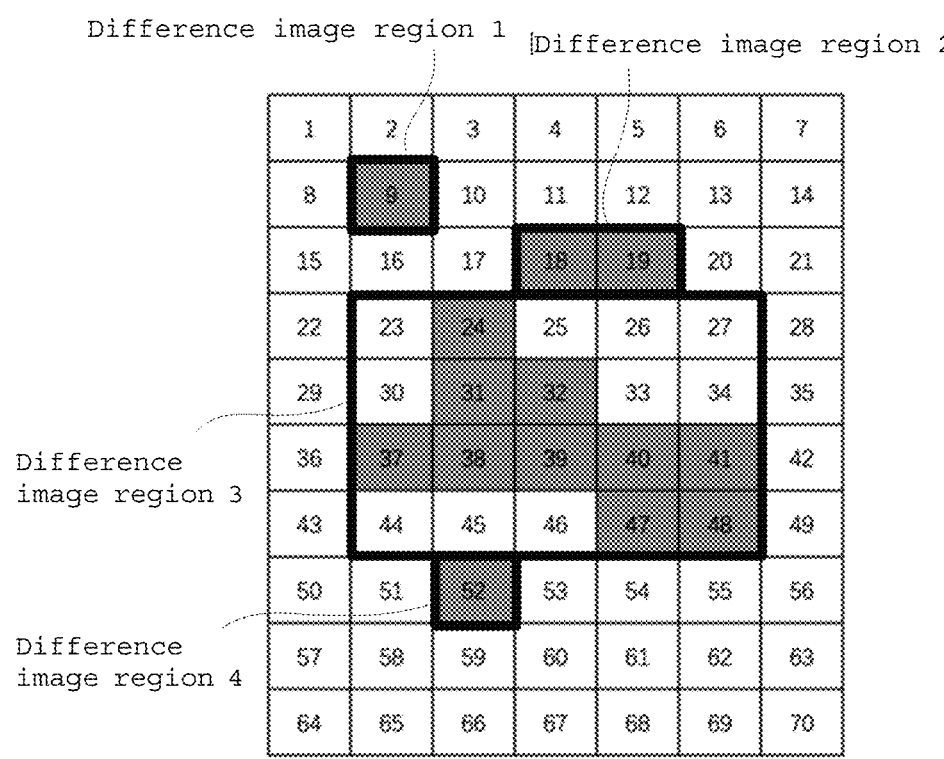

In order to understand the above-described objects, features and advantages of the present disclosure more explicitly, the solution of the present disclosure will be further described below. It is to be noted that, the embodiments of the present disclosure and the features in the embodiments may be combined with each other in the case without a conflict.

In the following description, many specific details will be elaborated in order to adequately understand the present disclosure, however, the present disclosure may be implemented in other methods than that described here; apparently, the embodiments in the specification are only some of the embodiments of the present disclosure, rather than all of the embodiments.

Although the disk space occupied by the snapshots can be reduced by using a lossless compression storage method in a png format in the related art, the image compression and decompression process in a png format is very complicated and time-consuming, and the user needs to wait for a long time when some operations are undone. Therefore, during the image editing process, how to reasonably reduce the storage space occupied by image data is an urgent problem to be solved.

The present disclosure provides an image processing method and apparatus, an electronic device, a readable storage medium and a program product, wherein the method determines a storage method of a processed image by analyzing the proportion of difference image patches of the processed image and the snapshot types of the last N snapshots in the snapshot chain generated according to consecutive image editing instructions during the image editing process, so as to implement reasonably reducing the disk storage space occupied by the snapshots.

The image processing method provided by an embodiment of the present disclosure may be performed by an electronic device. The electronic device may comprise a tablet computer, a cell phone (for example, a folding screen cell phone, a large screen cell phone and the like), a wearable device, a vehicle-mounted device, an augmented reality (AR)/virtual reality (VR) device, a notebook computer, an ultra-mobile personal computer (UMPC), a netbook, a personal digital assistant (PDA), and the like, and the present disclosure is not limited to a specific type of the electronic device.

In the following embodiments, with an electronic device as an example, and an image editing application (hereinafter referred to as Application 1) installed on the electronic device as an example, the image processing method provided by the present disclosure will be introduced in detail.

FIG. 1 is a flowchart of an image processing method provided by an embodiment of the present disclosure. Referring to FIG. 1, the method of this embodiment comprises:

S101, obtaining the incremental snapshot corresponding to the first image.

In this solution, the first image is obtained by editing a second image according to a first editing instruction. Wherein the first editing instruction may be an instruction generated by the electronic device according to any image editing function provided by the image editing application.

As an example, the first editing instruction may be obtained by, but not limited to the following methods.

As an example, the electronic device may comprise a touch screen, and the Application 1 displays controls corresponding to some image editing functions on the display screen of the electronic device, and the user inputs the first image editing instruction to the electronic device by operating (for example, by a clicking operation) the controls corresponding to the image editing functions displayed on the touch screen.

As an example, the electronic device is connected with an input device such as a mouse and a keyboard, and the Application 1 displays controls corresponding to some image editing functions on the display screen of the electronic device, so that the user inputs a first image editing instruction to the electronic device by operating an input device such as a mouse and a keyboard and inputting instructions for the controls.

It should be understood that the embodiment of the present disclosure is not limited to a specific implementation of obtaining the first editing instruction by the electronic device. For example, the user may also input the first editing instruction based on a speech method.

The incremental snapshot corresponding to the first image comprises data of difference image patches between the first image and a second image.

Alternatively, the incremental snapshot corresponding to the first image may only comprise data of all the difference image patches if the difference image patches are not merged in region. Referring to FIG. 2a, the image is divided into 70 image patches provided with tags 1-70 respectively; wherein these image patches with tags 9, 18, 19, 24, 31, 32, 37-41, 47, 48 and 52 are difference image patches (image patches with a difference are difference image patches). If these image patches with a difference are not merged in region, the incremental snapshot corresponding to the first image only comprises data of these image patches with tags 9, 18, 19, 24, 31, 32, 37-41, 47, 48 and 52.

Alternatively, if the difference image patches are merged in region, the incremental snapshot corresponding to the first image may comprise data of each difference image region determined according to the continuity of difference image patches. One possible implementation is to determine at least one difference image region and image patches comprised in each difference image region according to the continuity of difference image patches.

Referring to FIG. 2b, according to the continuity between the image patches with tags 9, 18, 19, 24, 31, 32, 37-41, 47, 48 and 52, it is possible to determine four difference image regions, that is, a difference image region 1 to a difference image region 4 as shown in the bold rectangular block in FIG. 2b. As may be seen from FIG. 2b, some difference image regions comprise not only difference image patches, but also conventional image patches. Therefore, in this solution, all the image patches comprised in the difference image region 1 to the difference image region 4 are determined as difference image patches.

Another possible implementation is to determine one difference image region according to a minimum outer bounding box of all the difference image patches. As shown by the bold rectangular block in FIG. 2c, the difference image regions are the smallest outer bounding boxes of the image patches with tags 9, 18, 19, 24, 31, 32, 37-41, 47, 48 and 52.

In this solution, the data in the incremental snapshot may also be stored with a difference image region as a unit by merging the difference image patches in region; if the user inputs an undoing instruction or a redoing instruction, it is possible to read and write data with a difference image region as a unit, which can reduce the I/O (input/output) times and improve the processing efficiency.

Alternatively, the incremental snapshot corresponding to the first image may be obtained by the following methods as an example.

One possible implementation is that, during the process of processing the second image according to the first image editing instruction, the electronic device first divides the second image into patches according to a preset image patch dividing method, and configures tag information for each image patch. Next, the electronic device performs image processing on the second image according to the first image editing instruction, so as to obtain a processed image (i.e. the first image) and tag information of modified image patches which are difference image patches. Then, an incremental snapshot corresponding to the first image is generated according to the position information of these difference image patches in the first image, the pixel points comprised in the difference image patches and whether the difference image patches need to merge the difference image regions.

Another possible implementation is that, the electronic device performs image processing on the second image according to the first image editing instruction, so as to obtain a processed image (i.e., the first image); next, the electronic device divides the first image and the second image into patches according to a preset image patch dividing method; further, the image patches of the first image and the second image at the same position are compared to determine whether there is a difference between the image patches at this position; if there is a difference, the image patch at this position in the second image is tagged as a difference image patch; if there is no difference, the image patch at this position in the second image is tagged as a conventional image patch. All the difference image patches are determined by comparing the image patches one by one; next, an incremental snapshot corresponding to a first image is generated according to the position information of the difference image patches in the first image, the pixels comprised in difference image patches and whether difference image patches needs to merge the difference image regions.

Alternatively, an incremental snapshot corresponding to a first image may be stored in the data format shown in Table 1 below.

TABLE 1

| |
| --- |
| Total P of image patches in a horizontal direction (4 bytes) |
| Total Q of image patches in a vertical direction (4 bytes) |
| Total W of difference image patches (4 bytes) |
| Tag of the first difference image patch (4 bytes) |
| Size of the first difference image patch (4 bytes) |
| Data of the first difference image patch (4 bytes) |
| Tag of the second difference image patch (4 bytes) |
| Size of the second difference image patch (4 bytes) |
| Data of the second difference image patch (4 bytes) |
| ...... |
| Tag of the W-th difference image patch (4 bytes) |
| Size of the W-th difference image patch (4 bytes) |
| Data of the W-th difference image patch (4 bytes) |

It should be understood that, in actual applications, an incremental snapshot may also be stored in another data format, which is not limited to the data storage format shown in Table 1.

Wherein, the preset image patch dividing method may be determined by combining one or more factors such as the resolution of the image, the occupation of hardware resources in the electronic device, and the patch dividing method (evenly or unevenly divided).

As an example, patch dividing may be performed according to a relatively fixed method. For example, a corresponding relation among the resolution of the image, the size of the image patch and the patch dividing method is established in advance. For example, for an image with a resolution of 4096*4096, even division is performed according to a patch dividing method determined by inquiring the above-described relation, and the size of each image patch is 128*128.

Alternatively, the size of the image patch may also be set flexibly. For example, an edge region of the image is divided into patches with a larger size of each image patch; a central region of the image is divided into patches with a smaller size of each image patch. For another example, a critical region of the image is divided into patches with a smaller size of each image patch; a non-critical region of the image is divided into patches with a larger size of each image patch; wherein the critical region and the non-critical region may be determined according to the position of a target object in the two images before and after processing respectively.

S102, determining a storage method corresponding to the first image according to any of the proportion of difference image patches comprised in the incremental snapshot or N snapshots in the snapshot chain according to a reversed temporal sequence; where N is an integer greater than or equal to 1.

Wherein, the snapshot types comprise: incremental snapshot and full snapshot. The storage method corresponding to the first image is configured to instruct a snapshot type in which the first image is stored.

In this step, the proportion of the difference image patches corresponding to the first image and the snapshot types of the last N snapshots in the snapshot chain are combined to ensure that the data of the first image is stored by using a full snapshot method in the case where the difference image patches corresponding to the first image account for a relatively large proportion, and in the case where the last N snapshots in the snapshot chain are incremental snapshots. In other cases, the data of the first image is stored by using an incremental snapshot method.

One possible implementation is that if the proportion of difference image patches comprised in the incremental snapshot corresponding to the first image is greater than or equal to a preset threshold, or the last N snapshots in the snapshot chain are incremental snapshots, that is, any of the above-described conditions is satisfied, the storage method corresponding to the first image is to store a full snapshot corresponding to the first image; if the proportion of difference image patches comprised in the incremental snapshot corresponding to the first image is less than a preset threshold, and the N snapshots comprise full snapshots, the storage method corresponding to the first image is to store an incremental snapshot corresponding to a first image.

Alternatively, the preset threshold is equal to 0.5, and N is equal to 3. Wherein, the preset threshold and N may also be set to other values, and the present disclosure is not limited thereto. For example, the preset threshold and the value of N may be determined according to the occupation of the storage resource in the electronic device. Of course, other factors than the occupation of the storage resource in the electronic device may also be considered, and the present disclosure is not limited thereto.

By reasonably storing the incremental snapshot and the full snapshot in the snapshot chain, it is possible to not only reduce the disk space occupied by the snapshots, but also lessen the time consumed in an undoing instruction. Specifically, the disk space occupied by the snapshots may be reduced by storing the incremental snapshots; by reasonably storing the full snapshots, when the user inputs an undoing instruction, the electronic device can read the latest full snapshots and execute the undoing instruction, thereby returning a result to the user at a fast speed, and enabling to lessen the time consumed by the electronic device to execute an undoing instruction input by the user.

S103, storing the incremental snapshot or the full snapshot corresponding to the first image in the snapshot chain according to the storage method corresponding to the first image.

Specifically, if the storage method corresponding to the first image instructs to store a full snapshot corresponding to the first image, the full snapshot corresponding to the first image is stored in a target snapshot node in the snapshot chain.

If the storage method corresponding to the first image instructs to store an incremental snapshot corresponding to a first image, the incremental snapshot corresponding to the first image is stored in a target snapshot node in the snapshot chain.

Figure 3A:
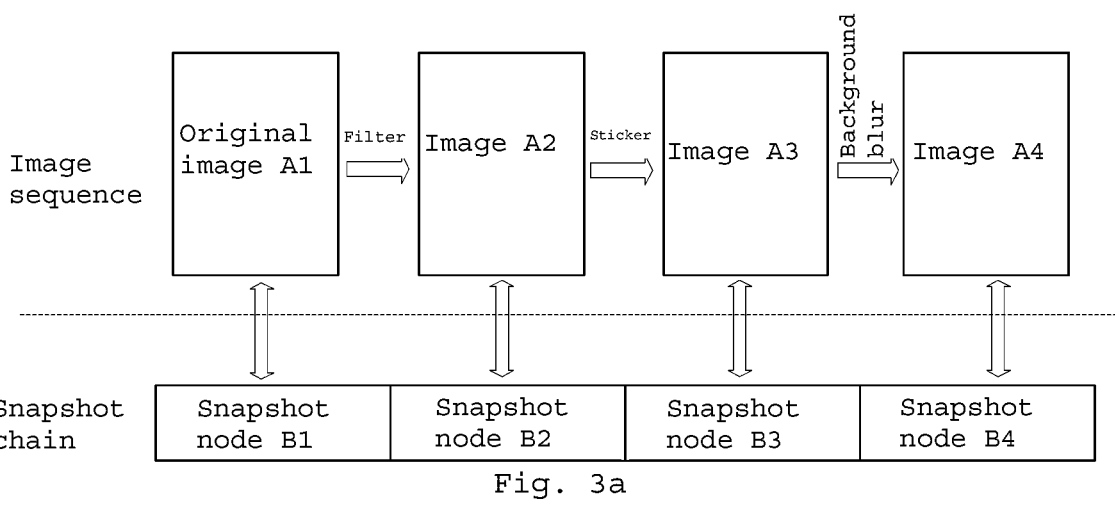
FIGS. 3a-3c are schematic views of a relation between a snapshot chain and an image sequence provided by the present disclosure.

For example, referring to FIG. 3a, suppose that A1 represents an input original image, the input original image may be any type of image, for example, a natural scenery image, a building image, a food image, a still image, etc., the present disclosure being not limited to the image content of the original image; based on the instruction input by the user, the electronic device correspondingly processes the original image A1 in turn according to a sequence of filter, sticker and background blur; wherein, referring to FIG. 3a, the snapshot node B1 is used to store the snapshot corresponding to the original image, B2 is used to store the snapshot corresponding to the image A2 obtained by filter processing A1; B3 is used to store the snapshot corresponding to the image A3 obtained by stick processing A2; B4 is used to store the snapshot corresponding to the image A4 obtained by background blur processing A3.

Here, combined with the scene shown in FIG. 3a, how to store the full snapshot or the incremental snapshot of the first image into the snapshot chain will be illustratively described according to the following cases:

Case 1: the user does not input any undoing instruction before inputting the first editing instruction.

In this case, a snapshot node is newly created at an extremity of the snapshot chain, wherein the newly created snapshot node is the aforementioned target snapshot node; the full snapshot or the incremental snapshot corresponding to the first image is stored in the newly created snapshot node.

Figure 3B:
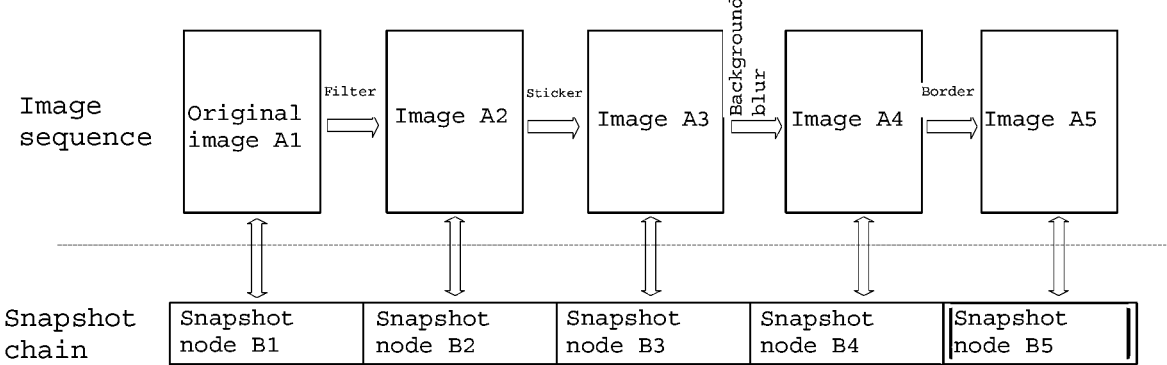

As an example, suppose that the first editing instruction input by the user is used to instruct to add a border to the image A4; since the user does not input any undoing instruction before inputting the first editing instruction, as shown in FIG. 3b, a new snapshot node B5 is created at an extremity of the snapshot chain, wherein the new snapshot node B5 is used to store a snapshot of the image A5 obtained after adding a border to the image A4.

Case 2: the user inputs S undoing instructions and R redoing instructions before inputting the first editing instruction.

In this case, the input sequence of S undoing instructions and R redoing instructions is not limited. For example, the user may consecutively input S undoing instructions, and then consecutively input R redoing instructions; alternatively, the user may input the undoing instruction and the redoing instruction at intervals. Of course, other sequences may also be used in inputting the undoing instruction and the redoing instruction, and the present disclosure is not limited thereto.

In Case 2, the electronic device may map each instruction to a snapshot node in the snapshot chain by analyzing the sequence of S undoing instructions and R redoing instructions, so as to finally determine whether the target snapshot node corresponding to the first editing instruction is an existing snapshot node or a newly created snapshot node in the snapshot chain.

The relation between the numbers of undoing instructions and redoing instructions may affect the position of the target snapshot node; the following two cases where the number S of undoing instructions is greater than the number R of redoing instructions, and the number S of undoing instructions is equal to the number R of redoing instructions will be illustratively introduced in detail below.

(a) In Case that S is Greater than R

In this case, it is necessary to determine a position of the target snapshot node in the snapshot chain according to a specific condition of an undoing instruction and a redoing instruction.

Figure 3C:
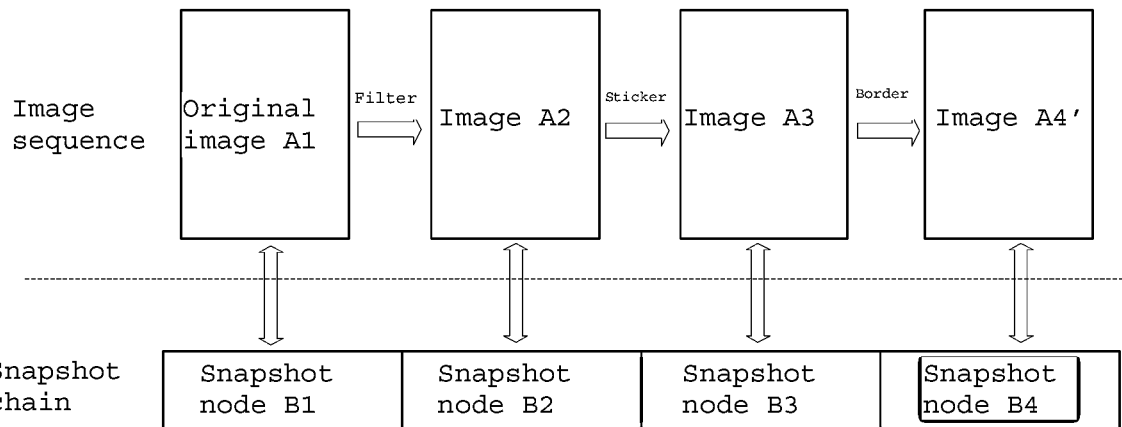

For example, suppose that before the first editing instruction input by the user is used to instruct to add a border to an image, the user first inputs two consecutive undoing instructions and then inputs a redoing instruction, as shown in FIG. 3c, it is possible to return to the image A2 through two consecutive undoing instructions and then resume to the image A3 through one redoing instruction; that is, the first editing instruction input by the user is used to instruct to add a border to the image A3; then, The target snapshot node should be the snapshot node B4, so that a new image A4' is obtained by adding a border to the image A3, and the full snapshot or the incremental snapshot corresponding to the image A4' is stored in the snapshot node B4.

(b) In Case that S is Equal to R

In this case, since the numbers of undoing instructions and redoing instructions are the same, it means that the user does not input any undoing instruction and redoing instruction before the user inputs the first editing instruction.

Therefore, reference may be made to the implementation of the aforementioned case 1, which will not be described in detail here.

In actual application, it is also possible to be present with other cases, with similar implementation principles, where each instruction is mapped into the snapshot chain, so as to determine the target snapshot node corresponding to the first editing instruction.

In this embodiment, the storage method of the first image is determined by analyzing the proportion of the difference image patches corresponding to the first image and the snapshot types of the last N snapshots in the snapshot chain generated according to the consecutive image editing instructions, so as to reasonably reduce the disk storage space occupied by the snapshots and lessen the time consumed by the electronic device to execute the undoing instruction input by the user.

FIG. 4 is a flowchart of an image processing method provided by another embodiment of the present disclosure. Referring to FIG. 4, the method of this embodiment comprises:

S201, obtaining the incremental snapshot corresponding to the first image.

S202, determining the storage method corresponding to the first image according to any of the proportion of difference image patches comprised in the incremental snapshot or N snapshots in the snapshot chain in a reversed temporal sequence, where N is an integer greater than or equal to 1.

S203, storing the incremental snapshot or the full snapshot corresponding to the first image in the snapshot chain according to the storage method corresponding to the first image.

S204, caching the incremental snapshot or the full snapshot corresponding to the first image into the memory space according to the storage method corresponding to the first image.

Wherein, the memory space is used to cache M snapshots in the snapshot chain in a reversed temporal sequence, M is an integer greater than or equal to 1, and M is less than or equal to N.

In addition, in this embodiment, S203 and S204 are not performed in sequence.

In this embodiment, some snapshots in the snapshot chain are cached in the memory space, and when the user inputs an undoing instruction, it is possible to directly obtain the snapshot for executing an undoing instruction from the memory space, which simplifies the step of writing some snapshots in the target snapshot into the memory space from the external disk space, thereby improving the processing efficiency and lessening the waiting time of the user. Moreover, in this solution, the number of snapshots cached in the memory space may be flexibly set according to the occupation of the memory space, so as to reduce the pressure on the memory space caused by snapshot caching.

FIG. 5 is a flowchart of an image processing method provided by another embodiment of the present disclosure. Referring to FIG. 5, the method of this embodiment comprises:

S301, obtaining a target snapshot from the snapshot chain according to an undoing instruction for the third image.

Wherein, the target snapshot for executing the undoing instruction comprises: a target full snapshot and all the snapshots between the target full snapshot and a snapshot corresponding to the third image.

Wherein, the target full snapshot is the first full snapshot in the snapshot chain in a reversed temporal sequence before the snapshot corresponding to the third image. All the snapshots between the target full snapshot and a snapshot corresponding to the third image are incremental snapshots.

Referring to the previous description, it may be known that the memory space stores the last M snapshots in the snapshot chain; if the undoing instruction obtained in this step is the X-th undoing instruction consecutively input, and if X is an integer greater than M, it means that M snapshots cached in the memory space only comprise some snapshots in the target snapshot, and thus other required snapshots can be read from the external disk space and write the same into the memory space. If X is less than or equal to M, it means that M snapshots cached in the memory space comprise all the snapshots in the target snapshot, and M snapshots cached in the memory space may be directly used to execute the undoing instruction, thereby simplifying the step of writing some snapshots in the target snapshot into the memory space from the external disk space and improving the processing efficiency.

S302, restoring a fourth image according to the target snapshot, wherein the third image is obtained by editing the fourth image according to a second editing instruction.

Specifically, all the snapshots between the target full snapshot and a snapshot corresponding to the third image are incremental snapshots, and the image patches at corresponding positions are replaced in turn according to a temporal sequence.

Suppose that the target full snapshot is tagged as Full (1), and all the snapshots between the target full snapshot Full (1) and the snapshot corresponding to the third image comprise Diff (1) and Diff (2). First of all, the image patch at a corresponding position in Full (1) is replaced by Diff (1)

so as to obtain Result (1); then, the image patch at a corresponding position in Result (1) is replaced by Diff (2) so as to obtain Result (2), wherein Result (2) is the snapshot corresponding to the fourth image. The electronic device restores and displays the fourth image according to the Result (2).

If the user consecutively inputs the undoing instruction for a plurality of times, it suffices to repeat S301 to S302.

Since the full snapshot is reasonably inserted during the storage process of the image, in this embodiment, it is possible to quickly restore the image according to the nearest target full snapshot and all the snapshots between the snapshots corresponding to the current image, thereby effectively lessening the waiting time of the user.

As an example, the present disclosure also provides an image processing device.

Figure 6:
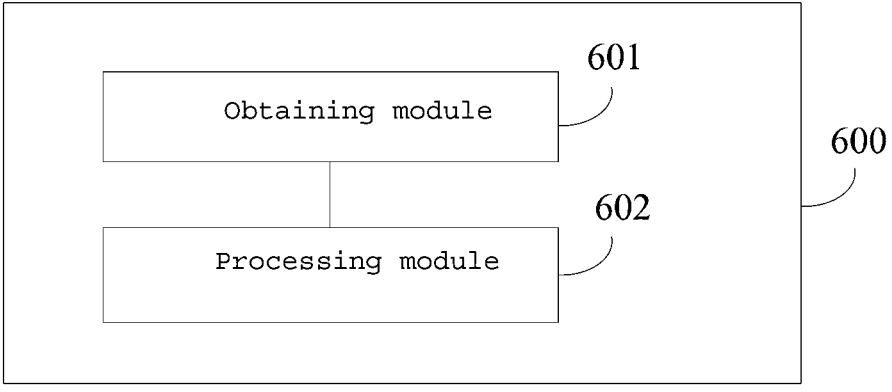
FIG. 6 is a structural view of an image processing device provided by an embodiment of the present disclosure.

FIG. 6 is a schematic structural view of an image processing device provided by an embodiment of the present disclosure. Referring to FIG. 6, an image processing apparatus 600 provided by this embodiment comprises:

an obtaining module 601 configured to obtain the incremental snapshot corresponding to the first image; wherein the incremental snapshot comprises data of difference image patches between the first image and a second image, and the first image is obtained by editing the second image according to a first editing instruction; and a processing module 602 configured to determine a storage method corresponding to the first image according to any of the proportion of difference image patches comprised in the incremental snapshot or N snapshots in the snapshot chain in a reversed temporal sequence; where N is an integer greater than or equal to 1; and store an incremental snapshot or a full snapshot corresponding to the first image into the snapshot chain according to the storage method corresponding to the first image.

In some possible designs, the processing module 602 is specifically configured such that, the storage method corresponding to the first image is to store a full snapshot corresponding to the first image if the proportion of difference image patches comprised in the incremental snapshot is greater than or equal to a preset threshold, or all the N snapshots are incremental snapshots; and the storage method corresponding to the first image is to store an incremental snapshot corresponding to a first image if the proportion of difference image patches comprised in the incremental snapshot is less than a preset threshold, and the N snapshots comprise full snapshots.

In some possible designs, the incremental snapshot comprises data of at least one difference image region; when the number of difference image regions is plural, each difference image patch between the first image and the second image belongs to one of the plurality of difference image regions.

In some possible designs, the at least one difference image region is determined according to the continuity of difference image patches between the first image and the second image.

In some possible designs, the processing module 602 is also configured to cache an incremental snapshot or a full snapshot corresponding to the first image into a memory space according to the storage method corresponding to the first image, wherein the memory space is used to cache M snapshots in the snapshot chain in a reversed temporal sequence, where M is an integer greater than or equal to 1, and M is less than or equal to N.

In some possible designs, the processing module 602 is further configured to obtain a target snapshot from the snapshot chain according to an undoing instruction for the third image; the target snapshot comprises a target full snapshot and all the snapshots between the target full snapshot and a snapshot corresponding to the third image; the target full snapshot is the first full snapshot in the snapshot chain in a reversed temporal sequence before the snapshot corresponding to the third image; and restoring a fourth image according to the target snapshot, wherein the third image is obtained by editing the fourth image according to a second editing instruction.

In some possible designs, the processing module 602 is specifically configured to obtain the target snapshot from the memory space if M snapshots cached in the memory space comprise the target snapshot; and if M snapshots cached in the memory space do not comprise some snapshots of the target snapshot, read said some snapshots from an external storage space (i.e., an external disk space) and write the same into the memory space.

The image processing device provided by this embodiment may be used to perform the technical solution of any of the above-mentioned method embodiments, with similar implementation principles and technical effects, which will not be described in detail here for conciseness.

Figure 7:
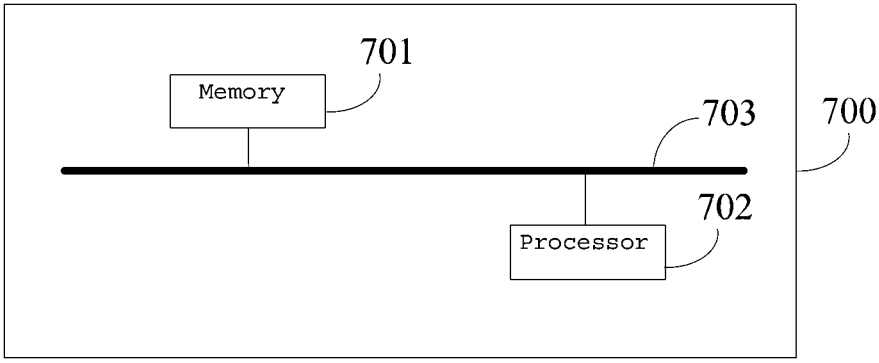
FIG. 7 is a schematic structural view of an electronic device provided by an embodiment of the present disclosure.

FIG. 7 is a schematic structural view of an electronic device provided by an embodiment of the present disclosure. Referring to FIG. 7, the electronic device 700 provided by this embodiment comprises a memory 701 and a processor 702.

Wherein, the memory 701 may be an independent physical unit which may be connected with the processor 702 via a bus 703. The memory 701 and the processor 702 may also be integrated together and implemented by hardware.

The memory 701 is configured to store program instructions which are called by the processor 702 to perform the operations of any of the above method embodiments.

Alternatively, when a part or an entirety of the method in the above embodiments is implemented by software, the above-described electronic device 700 may also only comprise the processor 702. The memory 701 for storing a program is located outside the electronic device 700, and the processor 702 is connected with the memory through a circuit/wire for reading and executing the program stored in the memory.

The processor 702 may be a central processing unit (CPU), a network processor (NP) or a combination of CPU and NP.

The processor 702 may also further comprise a hardware chip. The above-described hardware chip may be an application-specific integrated circuit (ASIC), a programmable logic device (PLD) or a combination thereof. The above-described PLD may be a complex programmable logic device (CPLD), a field-programmable gate array (FPGA), a generic array logic (GAL) or any combination thereof.

The memory 701 may comprise a volatile memory such as a random-access memory (RAM); the memory may also comprise a non-volatile memory, such as a flash memory, a hard disk drive (HDD) or a solid-state drive (SSD); the memory may also comprise a combination of the above-described kinds of memories.

The present disclosure also provides a computer-readable storage medium (which may also be referred to as a readable storage medium), and the computer-readable storage medium comprises computer program instructions that, when executed by at least one processor of the electronic device, perform the technical solution of any of the above method embodiments.

The present disclosure also provides a program product comprising computer program instructions stored in a readable storage medium, wherein at least one processor of the electronic device may read the computer program instructions from the readable storage medium, so that the at least one processor executes the computer program instructions to cause the electronic device to perform the technical solution of any of the above method embodiments.

It is to be noted that, the relational terms such as "first" and "second" herein are only used to distinguish one entity or operation from another entity or operation, but do not necessarily require or imply that there is any such actual relation or order between these entities or operations. Moreover, the terms "comprising", "comprising" or any other variation thereof are intended to cover non-exclusive inclusions, so that a process, method, article or device comprising a series of elements comprises not only those elements, but also other elements not explicitly listed or elements inherent to such process, method, article or device. In the case without further restrictions, an element defined by the phrase "comprising a/an . . . " does not exclude the existence of another identical element in the process, method, article or device comprising the element.

The above content only pertains to a detailed description of the present disclosure, so that those skilled in the art can understand or realize the present disclosure. Multiple modifications to these embodiments will be obvious for those skilled in the art, and the general principles defined herein may be realized in other embodiments without departing from the spirit or scope of this disclosure. Therefore, the present disclosure will not be limited to these embodiments described herein, but intended to conform to the broadest scope consistent with the principles and novel features disclosed herein.

What is claimed is:

1. An image processing method, comprising:
   obtaining an incremental snapshot corresponding to a first image; wherein the incremental snapshot comprises data of difference image patches between the first image and a second image, and the first image is obtained by editing the second image according to a first editing instruction;
   determining that a storage method corresponding to the first image is to store a full snapshot corresponding to the first image in response to the proportion of difference image patches comprised in the incremental snapshot being greater than or equal to a preset threshold, or in response to all the N snapshots being incremental snapshots;
   determining that the storage method corresponding to the first image is to store an incremental snapshot corresponding to the first image in response to the proportion of difference image patches comprised in the incremental snapshot being less than the preset threshold and the fact that the N snapshots comprise full snapshots; where N is an integer greater than or equal to 1; and
   storing an incremental snapshot or a full snapshot corresponding to the first image into the snapshot chain according to the storage method corresponding to the first image.

2. The method according to claim 1, wherein the incremental snapshot comprises data of at least one difference image region; each difference image patch between the first image and the second image belongs to one of a plurality of difference image regions when the number of the difference image regions is plural.

3. The method according to claim 2, wherein the at least one difference image region is determined according to a continuity of difference image patches between the first image and the second image.

4. The method according to claim 1, wherein the method further comprises:
   caching an incremental snapshot or a full snapshot corresponding to the first image into a memory space according to the storage method corresponding to the first image, wherein the memory space is used to cache M snapshots in the snapshot chain in a reversed temporal sequence, where M is an integer greater than or equal to 1, and M is less than or equal to N.

5. The method according to claim 4, wherein the method further comprises:
   obtaining a target snapshot from the snapshot chain according to an undoing instruction for a third image; the target snapshot comprises a target full snapshot and all the snapshots between the target full snapshot and a snapshot corresponding to the third image; the target full snapshot is the first full snapshot in the snapshot chain in a reversed temporal sequence before the snapshot corresponding to the third image; and
   restoring a fourth image according to the target snapshot, wherein the third image is obtained by editing the fourth image according to a second editing instruction.

6. The method according to claim 5, wherein the obtaining a target snapshot from the snapshot chain according to an undoing instruction for a third image comprises:
   obtaining the target snapshot from the memory space if M snapshots cached in the memory space comprise the target snapshot;
   reading some snapshots from an external storage space and writing the same into the memory space if M snapshots cached in the memory space do not comprise some snapshots of the target snapshot.

7. An electronic device comprising: a memory, a processor, and computer program instructions;
   wherein the memory is configured to store the computer program instructions; and
   the processor is configured to execute the computer program instructions to implement an image processing method, the method comprising:
   obtaining an incremental snapshot corresponding to a first image; wherein the incremental snapshot comprises data of difference image patches between the first image and a second image, and the first image is obtained by editing the second image according to a first editing instruction;
   determining that a storage method corresponding to the first image is to store a full snapshot corresponding to the first image if the proportion of difference image patches comprised in the incremental snapshot is greater than or equal to a preset threshold, or all the N snapshots are incremental snapshots;
   determining that the storage method corresponding to the first image is to store an incremental snapshot corresponding to the first image if the proportion of difference image patches comprised in the incremental snapshot is less than the preset threshold, and the N snapshots comprise full snapshots; where N is an integer greater than or equal to 1; and storing an incremental snapshot or a full snapshot corresponding to the first image into the snapshot chain according to the storage method corresponding to the first image.

8. The electronic device according to claim 7, wherein the incremental snapshot comprises data of at least one difference image region; each difference image patch between the first image and the second image belongs to one of a plurality of difference image regions when the number of the difference image regions is plural.

9. The electronic device according to claim 8, wherein the at least one difference image region is determined according to a continuity of difference image patches between the first image and the second image.

10. The electronic device according to claim 7, wherein the method further comprises:

caching an incremental snapshot or a full snapshot corresponding to the first image into a memory space according to the storage method corresponding to the first image, wherein the memory space is used to cache M snapshots in the snapshot chain in a reversed temporal sequence, where M is an integer greater than or equal to 1, and M is less than or equal to N.

11. The electronic device according to claim 10, wherein the method further comprises:

obtaining a target snapshot from the snapshot chain according to an undoing instruction for a third image; the target snapshot comprises a target full snapshot and all the snapshots between the target full snapshot and a snapshot corresponding to the third image; the target full snapshot is the first full snapshot in the snapshot chain in a reversed temporal sequence before the snapshot corresponding to the third image; and restoring a fourth image according to the target snapshot, wherein the third image is obtained by editing the fourth image according to a second editing instruction.

12. The electronic device according to claim 11, wherein the obtaining a target snapshot from the snapshot chain according to an undoing instruction for a third image comprises:

obtaining the target snapshot from the memory space if M snapshots cached in the memory space comprise the target snapshot;

reading some snapshots from an external storage space and writing the same into the memory space if M snapshots cached in the memory space do not comprise some snapshots of the target snapshot.

13. A non-transitory readable storage medium comprising:

computer program instructions that, when executed by at least one processor of an electronic device, implement an image processing method, the method comprising:

obtaining an incremental snapshot corresponding to a first image; wherein the incremental snapshot comprises data of difference image patches between the first image and a second image, and the first image is obtained by editing the second image according to a first editing instruction;

determining that a storage method corresponding to the first image is to store a full snapshot corresponding to the first image if the proportion of difference image patches comprised in the incremental snapshot is greater than or equal to a preset threshold, or all the N snapshots are incremental snapshots;

determining that the storage method corresponding to the first image is to store an incremental snapshot corresponding to the first image if the proportion of difference image patches comprised in the incremental snapshot is less than the preset threshold, and the N snapshots comprise full snapshots; where N is an integer greater than or equal to 1; and storing an incremental snapshot or a full snapshot corresponding to the first image into the snapshot chain according to the storage method corresponding to the first image.

14. The non-transitory readable storage medium according to claim 13, wherein the incremental snapshot comprises data of at least one difference image region; each difference image patch between the first image and the second image belongs to one of a plurality of difference image regions when the number of the difference image regions is plural.

15. The non-transitory readable storage medium according to claim 14, wherein the at least one difference image region is determined according to a continuity of difference image patches between the first image and the second image.

16. The non-transitory readable storage medium according to claim 13, wherein the method further comprises:

caching an incremental snapshot or a full snapshot corresponding to the first image into a memory space according to the storage method corresponding to the first image, wherein the memory space is used to cache M snapshots in the snapshot chain in a reversed temporal sequence, where M is an integer greater than or equal to 1, and M is less than or equal to N.

17. The method according to claim 16, wherein the method further comprises:

obtaining a target snapshot from the snapshot chain according to an undoing instruction for a third image; the target snapshot comprises a target full snapshot and all the snapshots between the target full snapshot and a snapshot corresponding to the third image; the target full snapshot is the first full snapshot in the snapshot chain in a reversed temporal sequence before the snapshot corresponding to the third image; and restoring a fourth image according to the target snapshot, wherein the third image is obtained by editing the fourth image according to a second editing instruction.

\* \* \* \* \*